(12) United States Patent
Chen et al.

(10) Patent No.: US 12,188,100 B2
(45) Date of Patent: Jan. 7, 2025

(54) SYSTEMS AND METHODS FOR AUTOMATIC SPRAY QUENCHING

(71) Applicant: Hydro Extrusion USA, LLC, Rosemont, IL (US)

(72) Inventors: Chunming Chen, Salt Lake City, UT (US); Mike Tozier, Portland, OR (US)

(73) Assignee: HYDRO EXTRUSION USA, LLC, Rosemont, IL (US)

( * ) Notice: Subject to any disclaimer, the term of this patent is extended or adjusted under 35 U.S.C. 154(b) by 0 days.

(21) Appl. No.: 18/094,576

(22) Filed: Jan. 9, 2023

(65) Prior Publication Data

US 2023/0220507 A1 Jul. 13, 2023

Related U.S. Application Data

(60) Provisional application No. 63/297,970, filed on Jan. 10, 2022.

(51) Int. Cl.
*C21D 1/667* (2006.01)
*C21D 1/18* (2006.01)

(52) U.S. Cl.
CPC .............. *C21D 1/667* (2013.01); *C21D 1/18* (2013.01)

(58) Field of Classification Search
CPC . C21D 1/667; C21D 1/18; C21D 1/60; C21D 11/005; C22F 1/002; B21C 29/003
(Continued)

(56) References Cited

U.S. PATENT DOCUMENTS 3,374,122 A * 3/1968 Cole ...................... G01K 7/025
374/E7.006
5,217,834 A * 6/1993 Higaki ................ G03F 7/70866
430/311
(Continued)

FOREIGN PATENT DOCUMENTS

CN 103397285 A 11/2013
CN 105648368 A 6/2016
(Continued)

OTHER PUBLICATIONS

International Search Report and Written Opinion issued in App. No. PCT/IB2023/050150, mailing date Mar. 31, 2023, 21 pages.

*Primary Examiner* — Jessee R Roe
*Assistant Examiner* — Michael Aboagye
(74) *Attorney, Agent, or Firm* — Wenderoth, Lind & Ponack, L.L.P.

(57) ABSTRACT

A spray quenching system including a quench box configured to receive a part for quenching. The system may include mechanical arms disposed within the quench box and thermocouples disposed on the mechanical arms that may be moved to contact the part surface. The system may include non-contact temperature sensors within the quench box that measure the temperature part surface, and spray nozzles within the quench box that spray the part with a quenching fluid. The system may include a controller in electronic communication with the mechanical arms, the spray nozzles, the thermocouples, and the non-contact temperature sensors, that is configured to initiate a quenching process, receive temperature data, analyze the temperature data to determine a temperature difference value, determine that the temperature difference value exceeds a threshold temperature difference value, and adjust the quenching process if the
(Continued)

temperature difference value exceeds the threshold temperature difference value.

9 Claims, 12 Drawing Sheets

(58) Field of Classification Search
USPC .................................. 266/44, 78, 113, 114
See application file for complete search history.

(56) References Cited

U.S. PATENT DOCUMENTS

| | | | |
|---|---|---|---|
| 5,382,306 | A | 1/1995 | Plata |
| 8,765,492 | B2 * | 7/2014 | Ono ........................ H01L 29/36 |
| | | | 438/16 |
| 9,863,709 | B2 * | 1/2018 | Neyens .................. F27D 11/08 |
| 2012/0028202 | A1 * | 2/2012 | Katsumata ............. C21D 1/667 |
| | | | 432/82 |

FOREIGN PATENT DOCUMENTS

| | | |
|---|---|---|
| CN | 113083912 A | 7/2021 |
| CN | 113106217 A | 7/2021 |
| EP | 2418447 A1 | 2/2012 |
| EP | 2674504 A1 | 12/2013 |
| GB | 1496377 A | 12/1977 |
| IT | LI20090004 A1 | 11/2010 |
| JP | 2000271634 A | 10/2000 |

* cited by examiner

SYSTEMS AND METHODS FOR AUTOMATIC SPRAY QUENCHING

CROSS-REFERENCE TO RELATED APPLICATIONS

This application claims priority to U.S. Provisional Application No. 63/297,970, filed Jan. 10, 2022, the entirety of which is incorporated by reference herein.

TECHNICAL FIELD

The present disclosure relates generally to the field of metal fabrication.

BACKGROUND

In fabricating parts made from metals such as aluminum alloy and others, a quenching process may be used to cool the part to instill desirable material properties. For example, during an extrusion process, an alloy may be relatively hot and quenching may occur to cool the extruded part. The quenching process, however, may result in undesirable properties such as part deformity that may be due to a non-uniform temperature gradient throughout the part during quenching.

SUMMARY

In an embodiment, the disclosure describes spray quenching system. The spray quenching system may include a quench box configured to receive a part for quenching, one or more mechanical arms disposed within the quench box, and one or more thermocouples disposed on the one or more mechanical arms. The part may be moving continuously. The mechanical arms may be configured to move the thermocouples to contact at least one surface of the part. The system may include one or more non-contact temperature sensors disposed within the quench box and configured to measure the temperature of the at least one surface of the part, and one or more spray nozzles disposed within the quench box and configured to spray portions of the part with a quenching fluid. The system may include a controller in electronic communication with the one or more mechanical arms, the spray nozzles, the thermocouples, and the non-contact temperature sensors. The controller may be configured to initiate a quenching process with the one or more spray nozzles using initial quenching parameters, receive temperature data from at least one of the one or more thermocouples or from the one or more non-contact temperature sensors, analyze the temperature data to determine a temperature difference value for the part, determine that the temperature difference value exceeds a threshold temperature difference value, and adjust the quenching process based on the determination that the temperature difference value exceeds the threshold temperature difference value.

In another embodiment, the disclosure describes a spray quenching system including a quench box configured to receive one or more parts for quenching and one or more temperature sensors configured to measure at least one surface of the one or more parts. The parts may be moving continuously. Each of the one or more robotic arms may be configured to move the respective temperature sensor of the one or more temperature sensors to contact at least one surface of one or more parts. The system may include one or more spray nozzles disposed within the quench box and configured to spray portions of the part with a quenching fluid, and a controller in electronic communication with the one or more temperature sensors and the one or more spray nozzles. The controller may be configured to initiate a quenching process with the one or more spray nozzles using initial quenching parameters, receive temperature data from the one or more temperature sensors, analyze the temperature data to determine a temperature difference value for the part, determine that the temperature difference value exceeds a threshold temperature difference value, and adjust the quenching process based on the temperature data.

In another embodiment, the disclosure describes a method of spray quenching. The method includes moving a portion of an extruded part into a quench box, pausing the extrusion process, and initiating, via one or more processors, an initial spray quenching process of the extruded part using initial spray quenching parameters. The method may include monitoring, via the one or more processors, temperatures of one or more surfaces of the extruded part via one or more temperature sensors and determining, via the one or more processors, that a temperature difference value between two or more surfaces of the extruded part exceeds a threshold temperature difference value. The method may include, based on the determination that the temperature difference value exceeds the threshold temperature difference value, determining, via the one or more processors, adjusted spray quenching parameters. The method may include initiating an adjusted spray quenching process of the extruded part using the adjusted spray quenching parameters. The method may include restarting the extrusion process and continuously moving the extruded part through the quench box. The method may include monitoring temperatures of one or more surfaces of the moving extruded part via one or more thermocouples or one or more non-contact temperature sensors. The method may include continually adjusting the spray quenching parameters as determined based on the analysis of the measured temperature with respect to the target temperature and/or the temperature difference values with respect to the temperature difference value threshold.

BRIEF DESCRIPTION OF THE DRAWINGS

Non-limiting and non-exhaustive embodiments are described in reference to the following drawings. In the drawings, like reference numerals refer to like parts through all the various figures unless otherwise specified.

For a better understanding of the present disclosure, a reference will be made to the following detailed description, which is to be read in association with the accompanying drawings, wherein.

DETAILED DESCRIPTION

Figure 1:
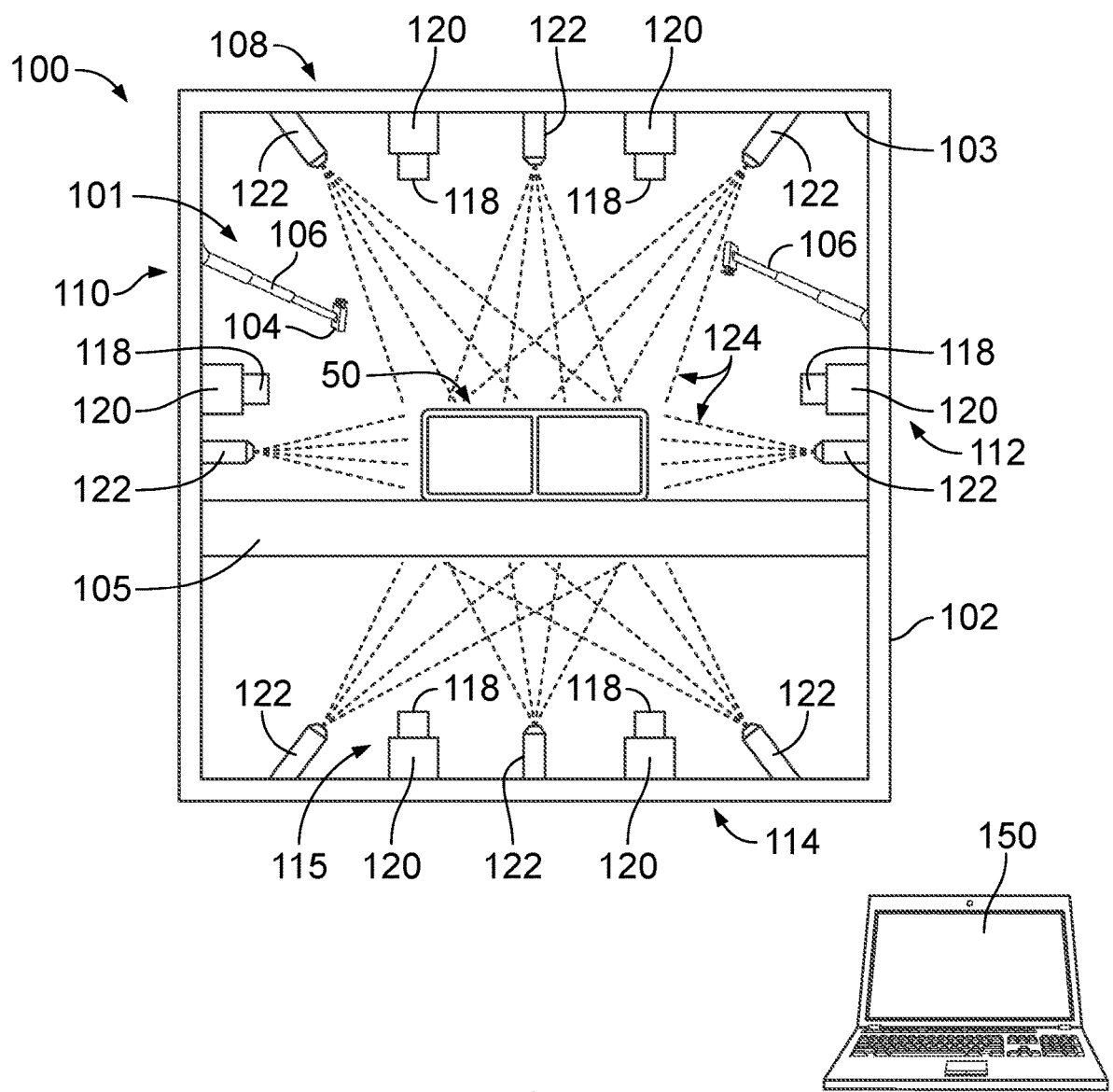
FIG. 1 is a schematic drawing of an embodiments of a spray quenching system as shown and described herein.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of entirely a hardware embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, although it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and includes plural references. The meaning of "in" includes "in" and "on."

The present disclosure describes, in some embodiments, systems and methods for automatic configuration and optimization of a spray quenching process for fabricated parts, such as extrusions, etc. The quenching systems and methods described herein may help minimize distortion of fabricated parts and may help achieve desirable material properties. In some embodiments, the quenching system may optimize by homogenizing the part's exterior temperature and/or by controlling quenching rates. In some embodiments, the quenching system may be intelligent and may include substantially real-time quenching temperature monitoring, analytics algorithms, and automatic spray nozzle controls.

In some embodiments, the quenching system may include a mechanical system that may manipulate and/or move the fabricated part, and a temperature measurement system that may monitor part temperature in order to optimize current and/or subsequent quenching processes. In some embodiments, the temperature monitoring for a given fabricated part may include temperature data that may be used in one or more analytics algorithms that may generate corrected temperature fields along a part and adjust the quenching process to better homogenize the part's exterior temperature and/or help achieve optimal quenching rates through multiple iterations of quenching trials. The analytics and temperature monitoring may also be used to automatically adjust and/or control spray nozzles, part positioning, and other aspects of the mechanical system.

In some embodiments, the quenching system and methods described herein may be used to quench multiple or many parts in a series or run of parts, such as extruded parts. In some embodiments, the extrusion process may substantially continuously produce one profile through single-cavity dies or multiple pieces of profiles through multi-cavity dies. For example, a client, process, or other system may order or otherwise request a substantially large number of parts to a particular part specification. Some part fabrication processes, such as the extrusion process, may include a quenching step whereby the fabricated part may be subjected to a quenching spray or another quenching process that may significantly reduce the part temperature. In some instances or applications, such cooling processes may affect the part's shape and/or material properties, some of which may be desirable and some of which may not be desirable. In order to efficiently and reliably fabricate relatively large numbers of parts, a part fabricator may run various iterative quenching trials to adjust the quenching process to improve the desired part shape and/or material properties for subsequent trials. Accordingly, optimizing the quenching parameters using the system and processes described herein may result in reduced post-fabrication adjustments and faster, more efficient identification of optimal quenching conditions and methods for a given part.

Figure 2A:
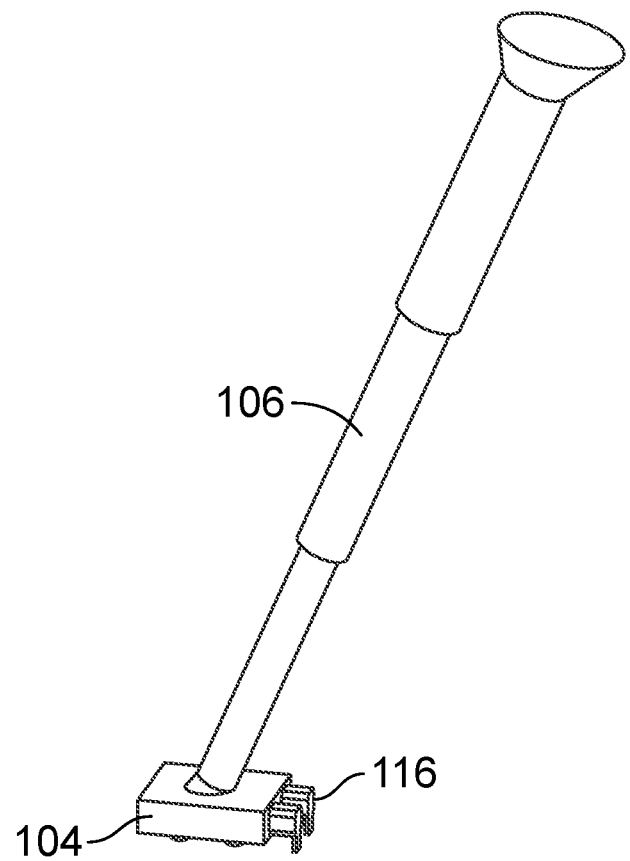
FIG. 2A is an embodiment of a mechanical arm of the spray quenching system of FIG. 1.

FIG. 1 shows an embodiment of a quenching system 100 for quenching one or more parts 50. The quenching system 100 may include a quench box 102 that may hold the fabricated part 50 during the quenching process, which may include quenching with water or another suitable fluid. The quench box 102 may include a conveyor 105, such as a conveyer belt, roller conveyors, or other suitable conveyance mechanism, that may move the part 50 through the quench box at the desired speed, or may be moved incrementally in accordance with a predetermined conveyance process. In some embodiments, the conveyor 105 may pause, start, slow, or speed up the movement of the part 50 through the quench box 102 as appropriate to complete the quench process. In some embodiments, the movement of the part 50 through the quench box 102 may be controlled by a computing device or controller, such as computing device 150, and may be adjustable to optimize the spray quenching process as described herein. The quench box 102 may include a gripper system 101 with one or more grippers 104 and/or mechanical arms 106. In some embodiments, the grippers 104 may be movably connected to a distal end of each of the mechanical arms 106 and proximate ends of each mechanical arm may be connected to an interior wall portion 103 of the quench box 102 or other suitable anchor points. The grippers 104 may be configured to open and close so as to grip and manipulate or just contact the fabricated part 50. The mechanical arms 106 may be telescoping and/or may have one or more articulating joints that may provide for manipulation of the grippers within the quench box 102 in three dimensions in order to access different portions of the part 50. For example, in some embodiments, two mechanical arms 106 and corresponding grippers 104 may disposed at a top 108 of the quench box 102, one mechanical arm 106 and corresponding grippers 104 may be disposed at each of a first side 110 and a second side 112 of the quench box, and two mechanical arms 106 and corresponding grippers 104 may be disposed at a bottom 114 of the quench box. FIG. 2A shows an enlarged illustration of one embodiment of a mechanical arm 106 and grippers 104. Of course, those skilled in the art will recognize that other configurations with other numbers of mechanical arms and grippers are also contemplated within the scope of the invention.

In some embodiments, the mechanical arms 106 may lengthen or stretch out to put their corresponding grippers 104 in contact with or adjacent to the part 50 at appropriate times during quenching trials. In some embodiments, the mechanical arms 106 and grippers 104 can locate the surfaces of the part in one or more ways, such as by using pre-loaded computer aided drafting (CAD) drawing or using laser guidance. In some embodiments, the mechanical arms 106 may be configured to apply a certain level of compression force to one or more surfaces of the part 50 without impeding the forward motion of the part 50. In some embodiments, the mechanical arms 106 may be configured to move along the part 50 longitudinally, such as in an extrusion direction.

In some embodiments, one or more thermocouples 116, such as shown in FIG. 2A, may be integrated into or otherwise disposed on the grippers 104 so as to measure a temperature of a surface of the part 50 at or in the vicinity of where the gripper may contact the surface. In some embodiments, during a quenching cycle, the system 100 may measure the temperature of the exterior surfaces of a part 50 using multiple temperature data points at each surface. In some embodiments, the system 100 may use post-processing analytics and/or algorithms to determine the temperature at substantially any point on the entire exterior surface based on the temperature data points. In some embodiments, this determination may include calculating the temperature at surface points between the measured data points by extrapolating a temperature gradient across the part surface or solving heat transfer problems. In some embodiments, the thermocouples 116 in the grippers 104 may take in-situ temperature measurements of the surface of a part 50 even while the quenching water or other fluid is being applied to the part. In some embodiments, at least some mechanical arms 106 and/or grippers 104 may include one or multiple thermocouples or thermocouple materials that may each measure temperature independently of one another or work in concert to measure temperatures of the part 50 surfaces.

Figure 2B:
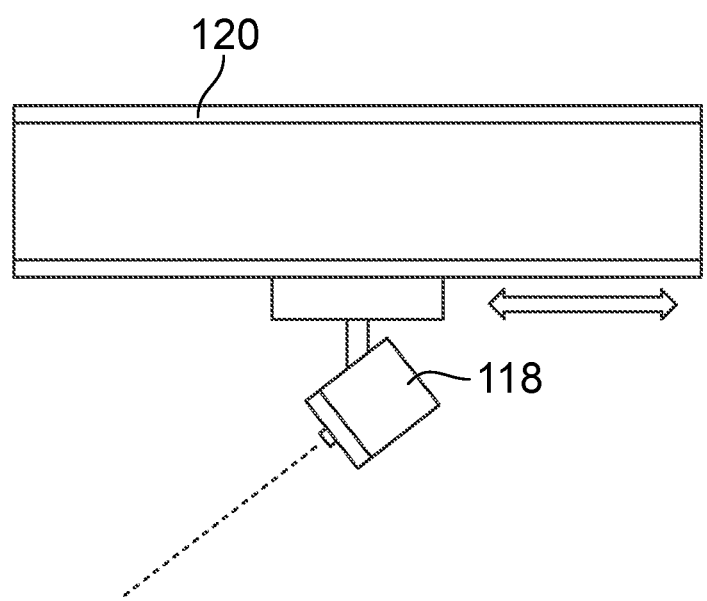
FIG. 2B is an embodiment of a non-contact temperature sensor of the spray quenching system of FIG. 1.

The system 100 may also include a non-contact temperature measurement system that may use non-contact temperature measuring methods (e.g., infrared) to measure temperature of the part 50 before, during, and after a quenching cycle. In some embodiments, an infrared temperature measurement system 115 may include temperature sensing equipment such as infrared pyrometers, infrared scanning system, or infrared thermal imaging cameras, will be placed inside the water quench box. In some embodiments, one or more sensors 118 of the infrared temperature measurement system may be disposed above, below, and/or to either side of the part 50, which may be disposed on the top 108, bottom 114, first side 110, and/or second side 112 of the quench box 102. In some embodiments, the quench box 102 may include one or more longitudinal rails 120 that may run substantially an entire length of the quench box from an entrance orifice to an exit orifice, and/or may extend outside the quench box in some embodiments. In some embodiments, pyrometers, cameras, or other types of suitable temperature sensors 118 may be configured to move along longitudinal rails 120, such as in an extrusion direction, and may additionally be moved or disposed outside of quench box 102, for example to measure the part 50 after quenching trials. FIG. 2B shows an enlarged illustration of one embodiment of a sensor 118 movably mounted on a rail 120 that may be disposed within the quench box 102. Of course, those skilled in the art will recognize that other embodiments may be used within the scope of the disclosure.

It is contemplated that, in some embodiments, the system 100 may include both the gripper system 101 and the non-contact/infrared temperature measurement system 115. Alternatively, some embodiments may include only a gripper system 101 or only a non-contact/infrared temperature measurement system 115.

In some embodiments, the quench box 102 may include one or more designated temperature measurement zones throughout the longitudinal length of the quench box. In some embodiments, in such temperature measurement zones, one or more spray nozzles 122 disposed inside the infrared temperature measurement zone may be turned off during the quenching trial and pyrometers, thermal cameras, or other sensors 118 may be disposed a certain distance outside or otherwise away from the quenching zone so as not to be affected by the quenching water or other fluid. The temperature sensors 118 (e.g., infrared pyrometers or infrared scanning system) may measure some or substantially all of the exterior surfaces of the fabricated part 50 and may use multiple data points at each surface. In some embodiments, a post-process analytics algorithm may calculate or otherwise determine the temperature at the whole exterior surfaces. This determination may include calculating the temperature at surface points between the measured data points by mathematically extrapolating a temperature gradient across the part surface or solving the heat transfer problems. In some embodiments, thermal imaging cameras may measure temperatures along a perimeter of a part instead of or in addition to a few select points.

In some embodiments, the quenching system 100 may include one or more computing devices 150 that may analyze temperature and other data collected by the components of the quenching system and/or control the one or more mechanical arms 106, grippers 104, spray nozzles 122, temperature sensors 118, etc. In some embodiments, the computing device 150 may be a single computing device configured to perform one or more of the computing activities described herein, or may be multiple computing devices each specially configured or specially programed to complete one or more of the computing tasks described herein. In some embodiments, portions of the computing device 150 may be remote from the quench box 102, or may be disposed on or within the quench box itself in some embodiments. In some embodiments, the computing device 150 may be in electronic communication with the other components of the quenching system 100, such as the sensors 118, the spray nozzles 122, the mechanical arms 106, the grippers 104, etc. The communication between the computing device 150 and the other components of the quenching system 100 may be via a wired or wireless connection. In some embodiments, the computing device 150 may additionally include one or more controllers specially configured to control movements and other behavior of the one or all of the various components of the quenching system 100 described herein.

In some embodiments, the computing device 150 may include executable instructions to perform one or more analytics algorithms that may serve various functions of the quenching system 100. For example, the computing device 150 may execute algorithmic instructions for analyzing temperature measurements taken from the various temperature sensors in the quenching system, such as temperature sensors 118. In some embodiments, the computing device 150 may be programmed to generate a corrected temperature field along the surfaces or the perimeter of the part 50. The computing device 150 may also be configured to automatically determine a spray quenching process setting that may substantially homogenize an exterior temperature of the part 50 and may help achieve optimal quenching rates over one or more iterations of quenching trials.

In some embodiments, the computing device 150 or other dedicated or general controllers in the quenching system 100 may be configured to provide automatic control of the one or more spray nozzles 122 to apply spray 124 to the part 50. In some embodiments, the spray nozzles 122 may be controlled automatically to configure spray pressure, spray volume, spray flow rate, spray angles, spray spacing, spray fluid temperature, etc. Accordingly, the computing device 150 and other controllers or other computing system may control the spray parameters and temperature sensing for an initial trial of a particular fabricated part, such as an extrusion, and then based on temperature data gathered from the temperature measurement system, analyze the data to reconfigure the spray parameters to more optimally maintain homogeneous temperature across the surface of the part 50 on subsequent trials. This sensing, analysis, and reconfiguration process may be repeatedly iterated throughout a run of parts or at least until a predetermined target may be met, such as a maximum threshold temperature gradient across the part, material property parameters, or a maximum threshold acceptable part deformation may be present.

Figure 3A:
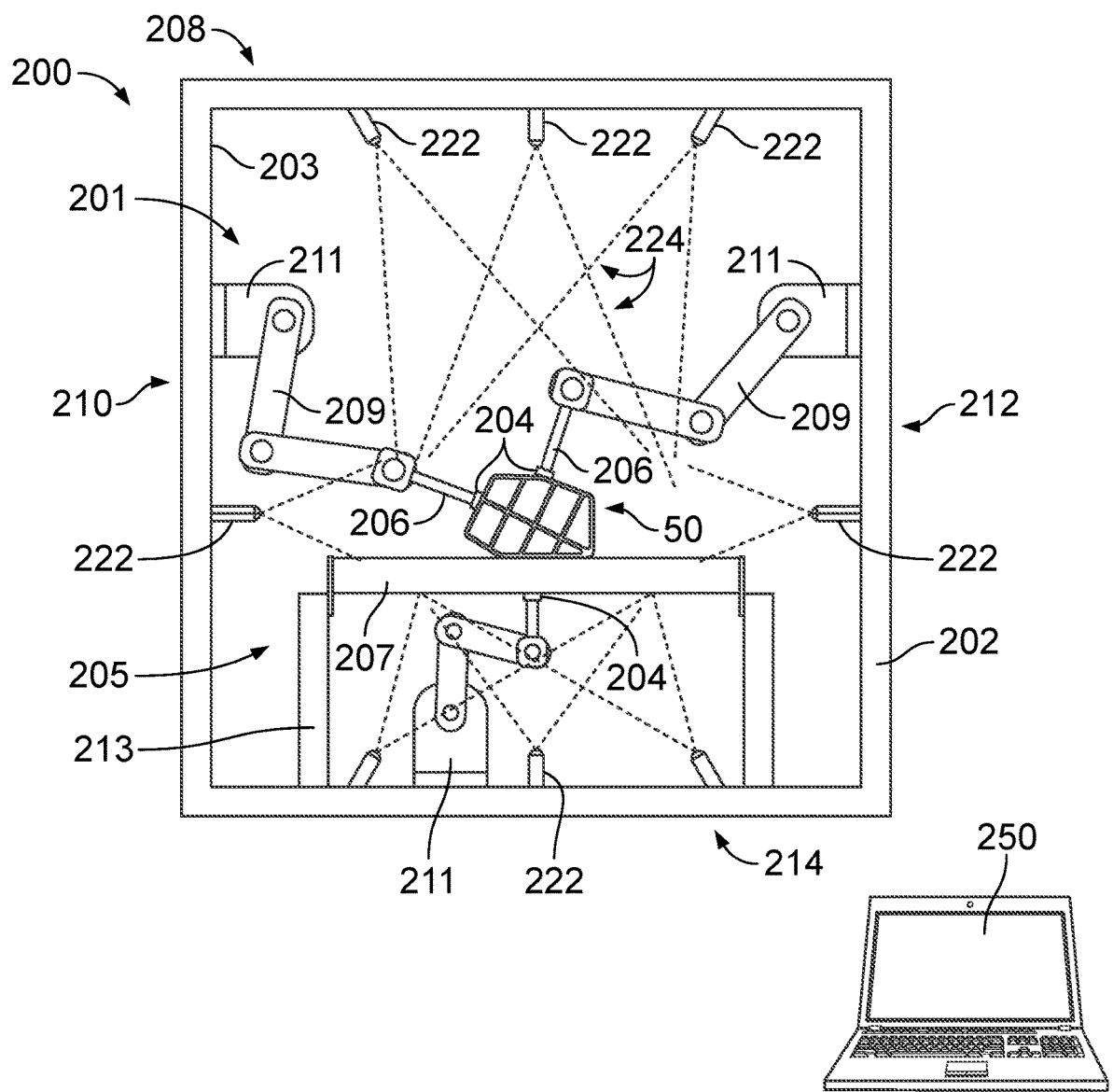
FIG. 3A is a schematic drawing of another embodiment of a spray quenching system as shown and described herein.
Figure 3B:
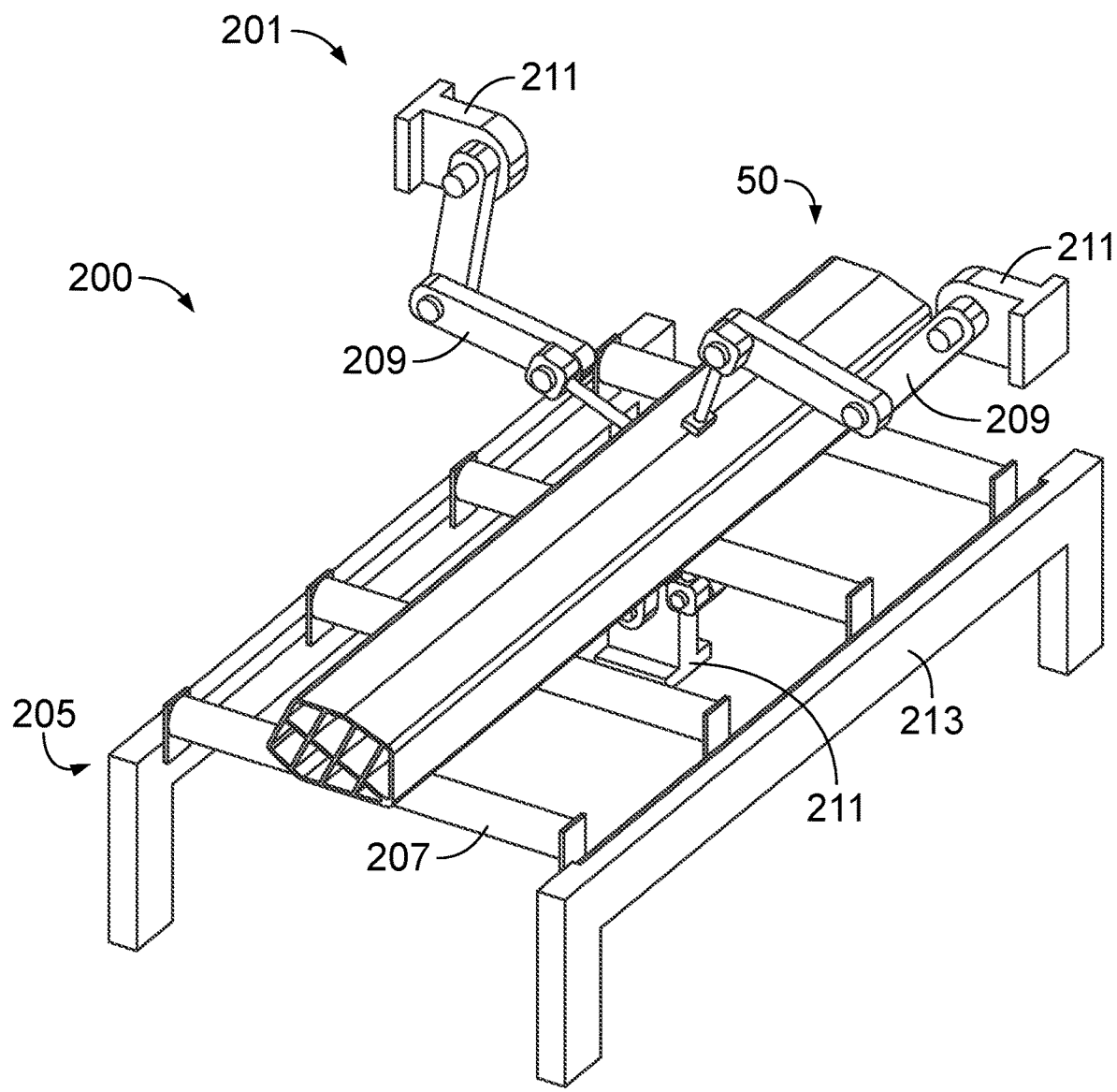
FIG. 3B is a partial perspective drawing of the spray quenching system of FIG. 3A.

FIGS. 3A and 3B illustrate another embodiment of a spray quenching system 200. The quenching system 200 may include a quench box 202 that may hold the fabricated part 50 during the quenching process, which may include quenching with water or another suitable fluid. In FIG. 3B, the walls of the quench box 202 are not shown for the sake of clarity. In some embodiments, the part 50 may be continuously extruded and quenched from one of a variety of fabrication processes, such as an extrusion process. The quench box 202 may include a conveyor 205, such as roller conveyors, a conveyor belt, or other suitable conveyance mechanism, that may move the part 50 through the quench box at the desired speed, or may be moved incrementally in accordance with a predetermined conveyance process. The conveyer 205 may include a runout table 213 with one or more rollers 207 upon which the part 50 may travel either via a powered conveyance mechanism or passive rolling. In some embodiments, the conveyor 205 may pause, start, slow, or speed up the movement of the part 50 through the quench box 202 as appropriate to complete the quench process. In some embodiments, the movement of the part 50 through the quench box 202 may be controlled by a computing device or controller, such as computing device 250, and may be adjustable to optimize the spray quenching process as described herein.

In some embodiments, the quench box 202 may include one or more spray nozzles 222 that may be disposed at a top 208, a bottom 214, a first side 210, and or a second side 212 of the quench box. In some embodiments, the spray nozzles 222 may be controlled automatically to configure spray pressure, spray volume, spray flow rate, spray angles, spray spacing, spray fluid temperature, etc.

The quench box 202 may include a temperature probe system 201 with one or more moving surface temperature probes 206 that may be connected to a robotic arm 209. In some embodiments, a contact head 204 may be connected to a distal end of each of the moving surface temperature probes 206 and proximate ends of each moving surface temperature probes may be connected to a robotic arm 209. In some embodiments, each robotic arm 209 may be anchored to an interior wall portion 203 of the quench box 202 or other suitable anchor points, such as with anchors 211. For example, in the embodiment shown in FIGS. 3A and 3B, one robotic arm 209 and corresponding moving surface temperature probe 206 may be disposed at each of a first side 210 and a second side 212 of the quench box at anchor points 211, and one robotic arm 209 and corresponding moving surface temperature probe 206 may be disposed at a bottom 214 of the quench box at another anchor point 211. The robotic arms 209 may be telescoping and/or may have one or more articulating or rotating joints that may provide for manipulation of the moving surface temperature probes 206 within the quench box 202 in three dimensions to access different portions of the part 50. In some embodiments, additionally or alternatively, robotic arms 209 may be anchored at anchor point on a top 208 of the quench box 202, and more or fewer robotic arms may be disposed in different positions. In some embodiments, the moving surface temperature probes 206 may include grippers that may be configured to open and close so as to grip and manipulate or just contact the fabricated part 50.

In some embodiments, the robotic arms 209 may manipulate the moving surface temperature probes 206 to put them in contact with or adjacent to the part 50 at appropriate times during quenching trials to measure the temperature of the surfaces of the part 50. In some embodiments, robotic arms 209 may locate the surfaces of the part 50 in one or more ways, such as by using pre-loaded computer aided drafting (CAD) drawing or using laser guidance. In some embodiments, the robotic arms 209 may be configured to apply a certain level of compression force to one or more surfaces of the part 50 without impeding the forward motion of the part 50. In some embodiments, the robotic arms 209 may be configured to moving surface temperature probes 206 along the part 50 longitudinally, such as in an extrusion direction. In some embodiments, at least some robotic arms 209 may include one or multiple moving surface temperature probes 206, thermocouples or thermocouple materials that may each measure temperature independently of one another or work in concert to measure temperatures of the part 50 surfaces.

Figure 4A:
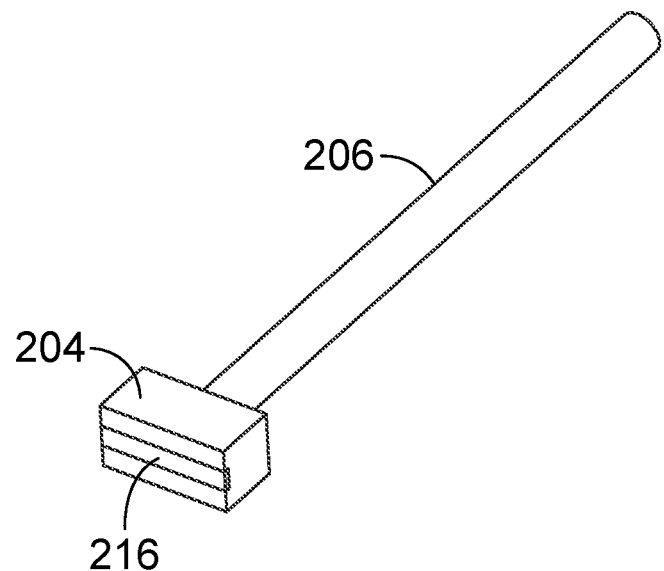
FIG. 4A is an embodiment of a moving surface temperature probe of the spray quenching system of FIG. 3A.

FIG. 4A shows an enlarged illustration of one embodiment of a moving surface temperature probe 206 that may include a thermocouple 216 disposed in the contact head 204. In such embodiments, temperature readings may be taken of the part 50 during contact. In some embodiments, the thermocouples 216 may be configured so as to measure a temperature of a surface of the part 50 at or in the vicinity of where the contact head 204 may contact the surface. In some embodiments, during a quenching cycle, the system 200 may measure the temperature of the exterior surfaces of a part 50 using multiple temperature data points at each surface. In some embodiments, the system 200 may use post-processing analytics and/or algorithms to determine the temperature at substantially any point on the entire exterior surface based on the temperature data points. In some embodiments, this determination may include calculating the temperature at surface points between the measured data points by extrapolating a temperature gradient across the part surface or solving heat transfer problems. In some embodiments, the thermocouples 216 in the contact heads 204 may take in-situ temperature measurements of the surface of a part 50 even while a part 50 is moving and the quenching water or other fluid is being applied to the part.

Figure 5A:
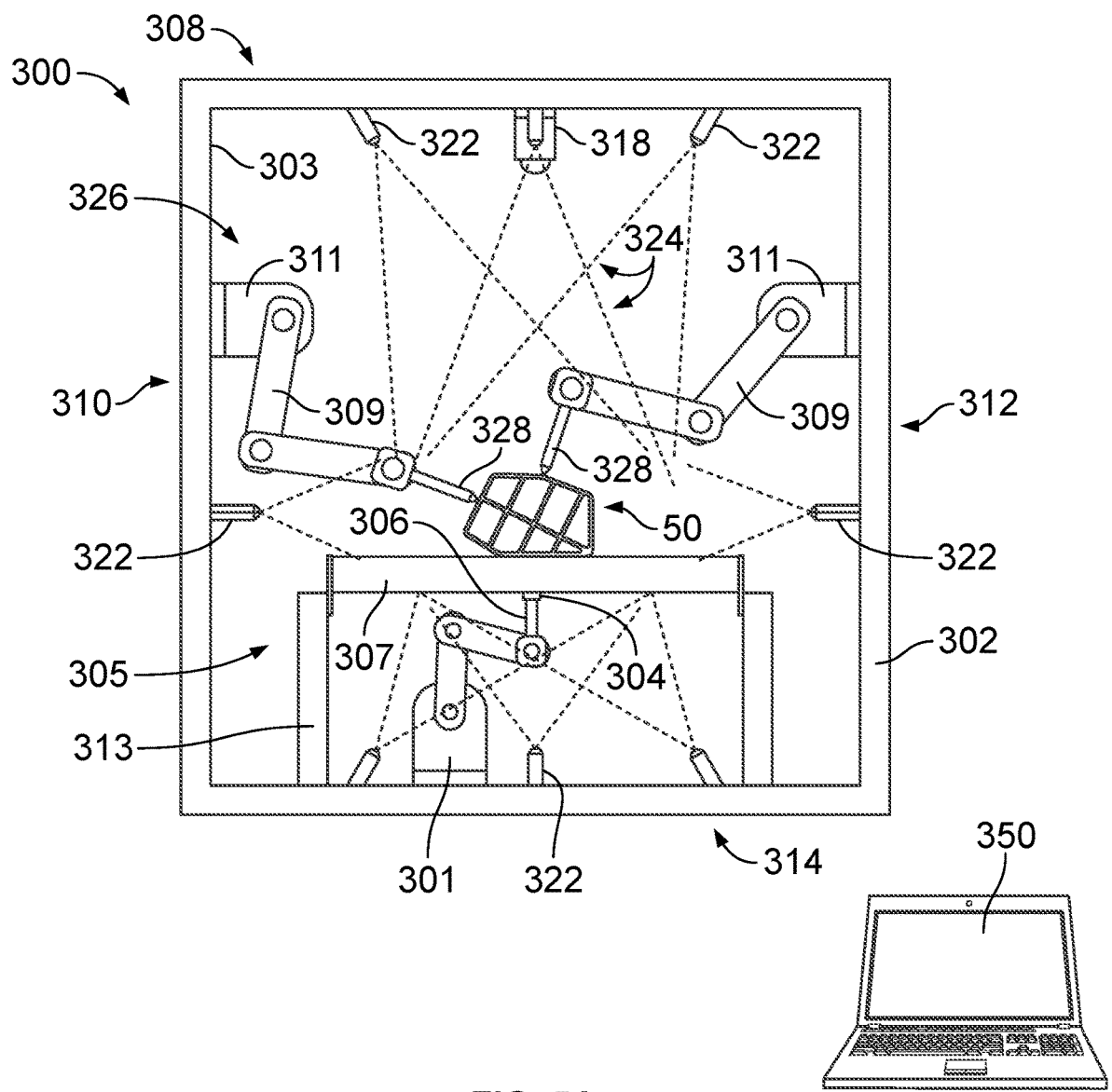
FIG. 5A is a schematic drawing of another embodiment of a spray quenching system as shown and described herein.
Figure 5B:
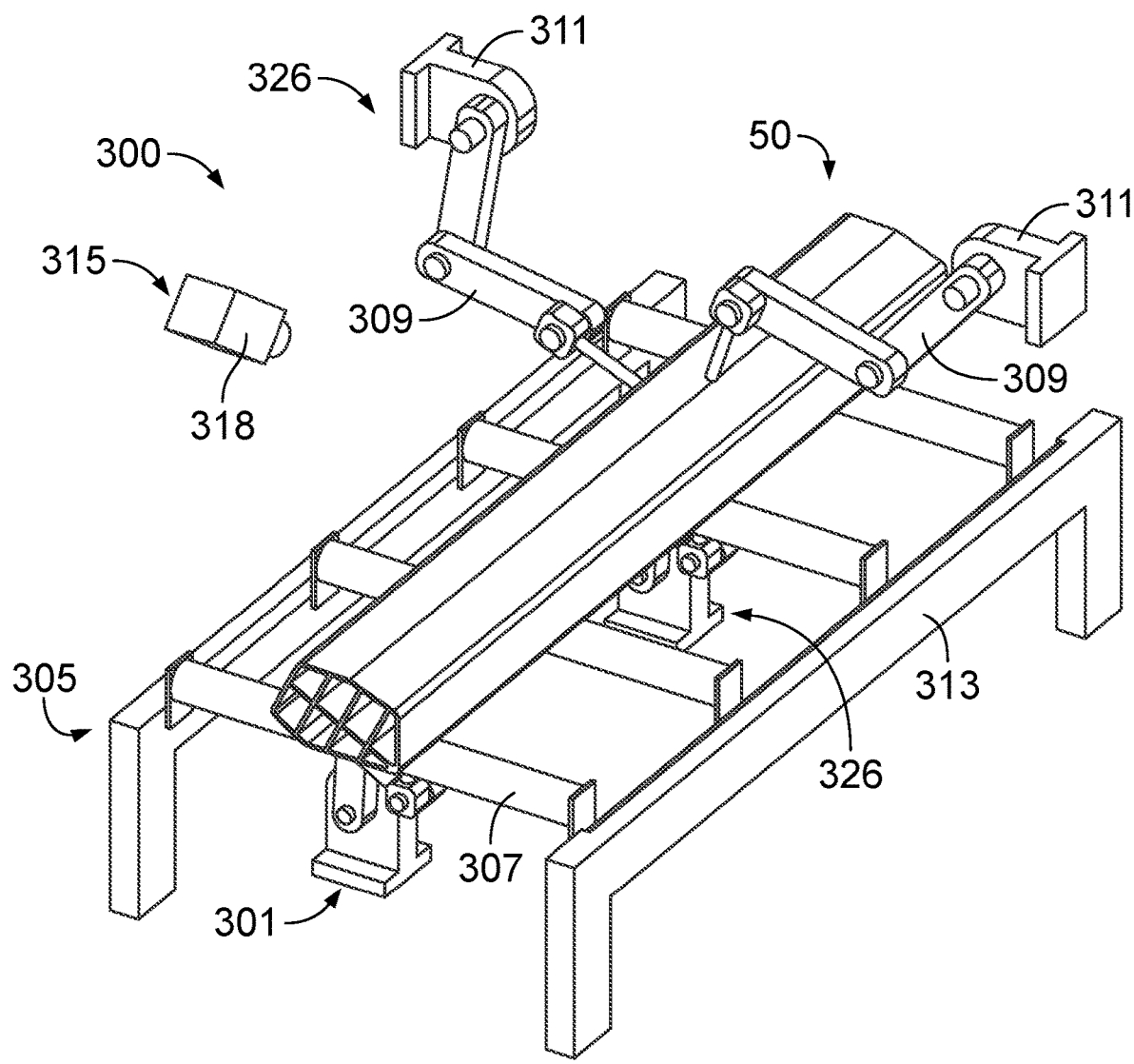
FIG. 5B is a partial perspective drawing of the spray quenching system of FIG. 5A.

FIGS. 5A and 5B illustrate another embodiment of a spray quenching system 300 that may have similar components to the spray quench system 200 but may include a static temperature probe system 326, a moving surface temperature probe system 301, and/or a non-contact temperature measurement system 315 The quenching system 300 may include a quench box 302 that may hold the fabricated part 50 during the quenching process, which may include quenching with water or another suitable fluid. In FIG. 5B, the walls of the quench box 302 are not shown for the sake of clarity. The quench box 302 may include a conveyor 305 that may include a runout table 313 with one or more rollers 307 upon which the part 50 may travel either via a powered conveyance mechanism or passive rolling. In some embodiments, the movement of the part 50 through the quench box 302 may be controlled by a computing device or controller, such as computing device 350, and may be adjustable to optimize the spray quenching process as described herein.

In some embodiments, the quench box 302 may include one or more spray nozzles 322 that may be disposed at a top 308, a bottom 314, a first side 310, and or a second side 312 of the quench box. In some embodiments, the spray nozzles 322 may be controlled automatically to configure spray pressure, spray volume, spray flow rate, spray angles, spray spacing, spray fluid temperature, etc.

The quench box 302 may include a temperature probe system 326 with one or more static temperature probes 328 that may each be connected to a robotic arm 309. In some embodiments, each robotic arm 309 may be anchored to an interior wall portion 303 of the quench box 302 or other suitable anchor points, such as with anchors 311. For example, in the embodiment shown in FIGS. 5A and 5B, one robotic arm 309 and corresponding static temperature probe 328 may be disposed at each of a first side 310 and a second side 312 of the quench box at anchor points 311, and one robotic arm 309 and corresponding static temperature probe 328 may be disposed at a bottom 314 of the quench box 302 at another anchor point 311. The robotic arms 309 may be telescoping and/or may have one or more articulating or rotating joints that may provide for manipulation of the static temperature probes 328 within the quench box 302 in three dimensions to access different portions of the part 50. In some embodiments, additionally or alternatively, robotic arms 309 may be anchored at anchor point on a top 308 of the quench box 302, and more or fewer robotic arms may be disposed in different positions.

In some embodiments, the system 300 may also include a moving surface temperature probe system 301 with one or more moving surface temperature probes 306 that may be connected to a robotic arm 309, similar to as described with respect to the system 200. In some embodiments, each robotic arm 309 may be anchored to an interior wall portion 303 of the quench box 302 or other suitable anchor points, such as with anchors 311. The moving surface temperature probe system 301 may be similar to the moving surface temperature probe system 201 described herein with reference to FIGS. 3A and 3B.

In some embodiments, the robotic arms 309 may manipulate the moving temperature probes 306 and/or static temperature probes 328 to put them in contact with or adjacent to the part 50 at appropriate times during quenching trials to measure the temperature at particular surfaces of the part 50. In some embodiments, robotic arms 309 may locate the surfaces of the part 50 in one or more ways, such as by using pre-loaded computer aided drafting (CAD) drawing or using laser guidance. In some embodiments, the robotic arms 309 may be configured to apply a certain level of compression force to one or more surfaces of the part 50 without impeding the forward motion of the part 50. In some embodiments, the robotic arms 309 may be configured to move the moving surface temperature probes 306 and/or the static temperature probes 328 along the part 50 longitudinally, such as in an extrusion direction. In some embodiments, the static temperature probes 328 may have specially designed tips such as pointed tips, needle tips, etc., to ensure sufficient penetrations into the part 50. In some embodiments, at least some robotic arms 309 may include one or multiple static temperature probes 328, thermocouples or thermocouple materials that may each measure temperature independently of one another or work in concert to measure temperatures of the part 50 surfaces.

Figure 4B:
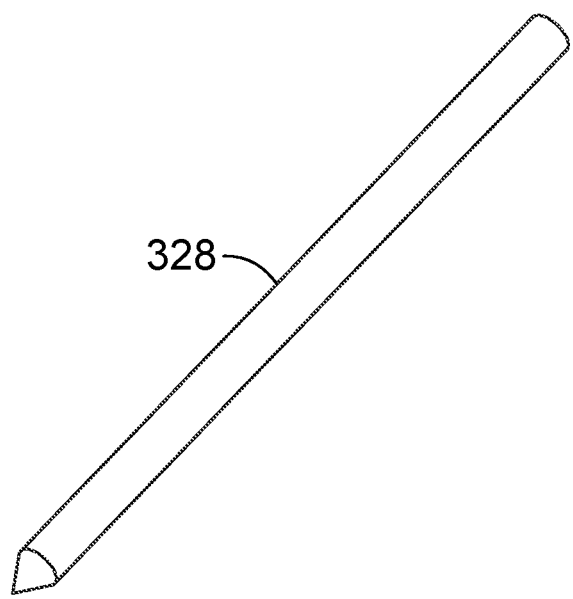
FIG. 4B is an embodiment of a static temperature probe of the spray quenching system of FIG. 3A.

FIG. 4B shows an enlarged illustration of one embodiment of a static temperature probe 328 that may be manipulated by the robotic arms 309. In such embodiments, temperature readings may be taken of the part 50 during probe contact or close vicinity to the surface of the part 50. In some embodiments, the probes 328 may be configured so as to measure a temperature of a surface of the part 50 at or in the vicinity of where the probe may contact the surface. In some embodiments, during a quenching cycle, the system 300 may measure the temperature of the exterior surfaces of a part 50 using multiple temperature data points at each surface. In some embodiments, the system 300 may use post-processing analytics and/or algorithms to determine the temperature at substantially any point on the entire exterior surface based on the temperature data points. In some embodiments, this determination may include calculating the temperature at surface points between the measured data points by extrapolating a temperature gradient across the part surface or solving heat transfer problems. In some embodiments, the static temperature probes 328 may take temperature measurements of the surface of a part 50 even while the quenching water or other fluid is being applied to the part and the part 50 remains static.

In some embodiments, the system 300 may also include a non-contact temperature measurement system that may use non-contact temperature measuring methods (e.g., infrared) to measure temperature of the part 50 before, during, and after a quenching cycle. In some embodiments, an infrared temperature measurement system 315 may include temperature sensing equipment such as infrared pyrometers, infrared scanning system, or infrared thermal imaging cameras, may be disposed inside the water quench box 302. In some embodiments, one or more sensors 318 of the infrared temperature measurement system may be disposed above, below, and/or to either side of the part 50, which may be disposed on the top 308, bottom 314, first side 310, and/or second side 312 of the quench box 302. In some embodiments, the moving surface temperatures probes 328 and/or the infrared sensors 318 may be disposed outside the quenching zone. The infrared temperature measuring system 315 may be similar to the system 115 as described with reference to FIG. 1. In some embodiments, the moving surface temperature probes 328 and/or infrared sensors 318 may take temperature measurements of the surfaces of a part 50 even while the part 50 is moving.

It is contemplated that, in some embodiments, the system 300 may include both the moving surface temperature probe system 301 and the non-contact/infrared temperature measurement system 315. Alternatively, some embodiments may include only a moving surface temperature probe system 301 or only a non-contact/infrared temperature measurement system 315.

Figure 6A:
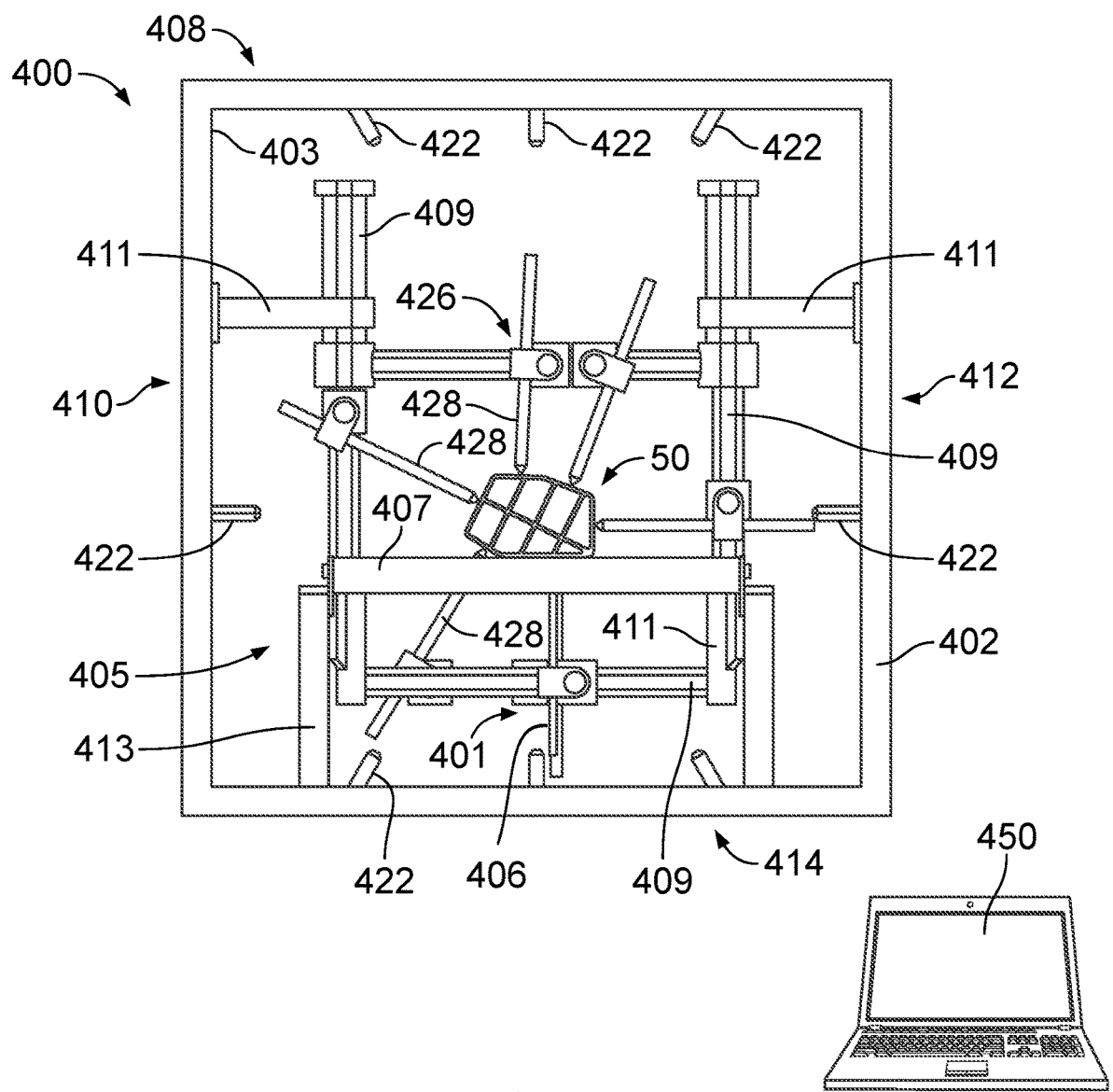
FIG. 6A is a schematic drawing of another embodiment of a spray quenching system as shown and described herein.
Figure 6B:
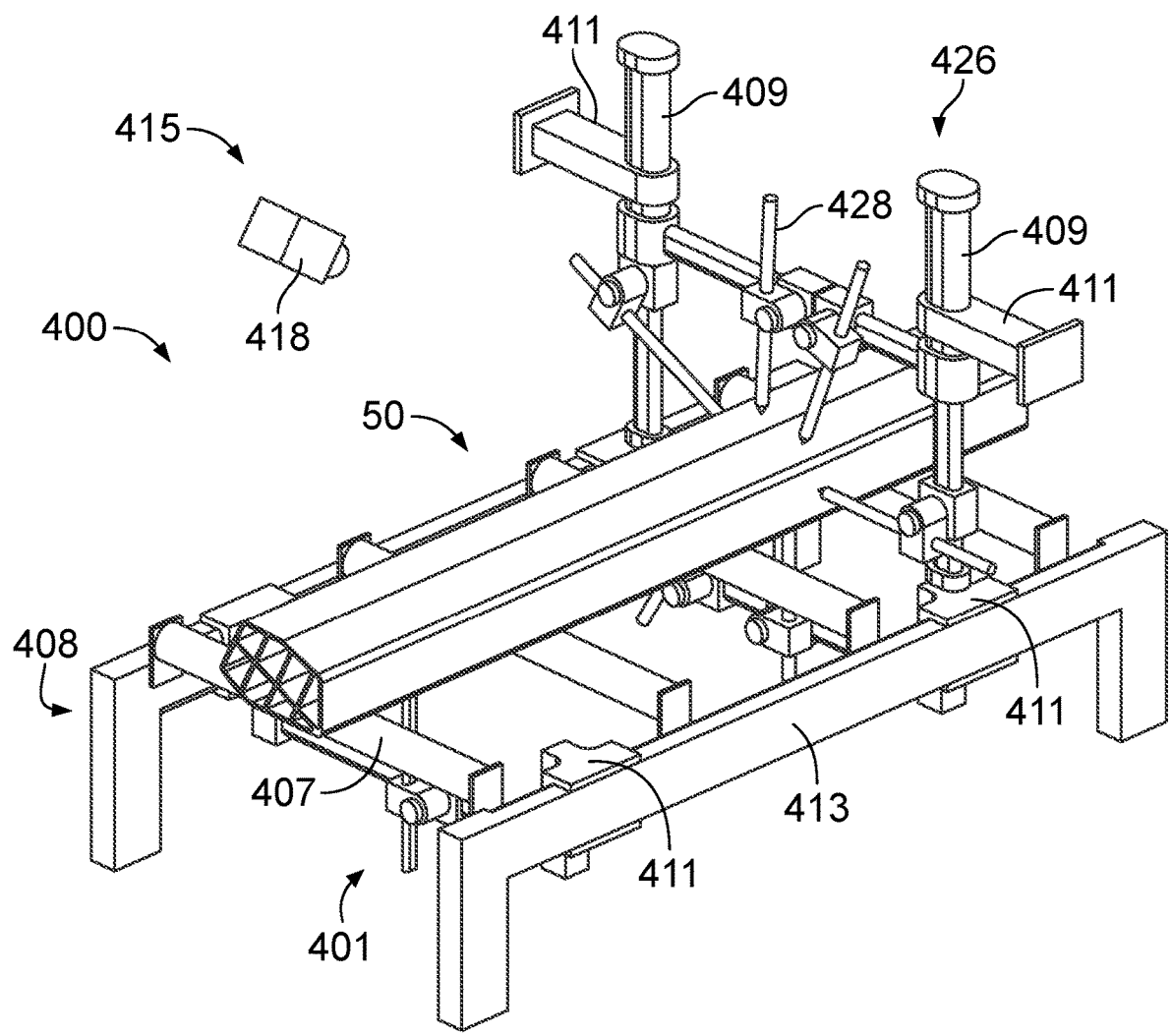
FIG. 6B is a partial perspective drawing of the spray quenching system of FIG. 6A.

FIGS. 6A and 6B illustrate another embodiment of a spray quenching system 400 that may have similar components to the spray quench systems 200 and 300 but may include another embodiment of robotic arms 409 with a static temperature probe system 426, a moving surface temperature probe system 401, and/or a non-contact temperature measurement system 415. In some embodiments, the moving surface temperature probe system 401 may be similar to, for example, systems 201 and 301 described herein. The quenching system 400 may include a quench box 402 that may hold the fabricated part 50 during the quenching process, which may include quenching with water or another suitable fluid. In FIG. 6B, the walls of the quench box 402 are not shown for the sake of clarity. The quench box 402 may include a conveyor 405 that may include a runout table 413 with one or more rollers 407 upon which the part 50 may travel either via a powered conveyance mechanism or passive rolling. In some embodiments, the movement of the part 50 through the quench box 402 may be controlled by a computing device or controller, such as computing device 450, and may be adjustable to optimize the spray quenching process as described herein.

In some embodiments, the quench box 402 may include one or more spray nozzles 422 that may be disposed at a top 408, a bottom 414, a first side 410, and or a second side 412 of the quench box. In some embodiments, the spray nozzles 422 may be controlled automatically to configure spray pressure, spray volume, spray flow rate, spray angles, spray spacing, spray fluid temperature, etc.

The quench box 402 may include a temperature probe system 426 with one or more static temperature probes 428 that may each be connected to a robotic arm 409. In some embodiments, each robotic arm 409 may be anchored to an interior wall portion 403 of the quench box 402 or other suitable anchor points, such as with anchors 411. In some embodiments, one or more of the robotic arms 409 may be anchored to portions of the conveyor 405, such as the runout table 413. For example, in the embodiment shown in FIGS. 6A and 6B, one robotic arm 409 and corresponding static temperature probe 428 may be disposed at each of a first side 410 and a second side 412 of the quench box 402 at anchor points 411 as well as to the runout table 413. Another robotic arm 409 and corresponding static temperature probe 428 may be disposed underneath the part 50 and may be coupled to the runout table 413 at other anchor points 411. In some embodiments, the robotic arms 409 may be telescoping and/or may have one or more articulating or rotating joints that may provide for manipulation of the static temperature probes 428 within the quench box 402 in three dimensions to access different portions of the part 50. Specifically, the embodiment shown in FIGS. 6A and 6B includes robotic arms 409 that may rotate or slide with respect to one another in order to position the temperature probes 428 to take temperature readings of the part 50 surface. In some embodiments, additionally or alternatively, robotic arms 409 may be anchored at anchor point on a top 408 of the quench box 402, and more or fewer robotic arms may be disposed in different positions.

In some embodiments, the robotic arms 409 may manipulate the static temperature probes 428 to put them in contact with or adjacent to the part 50 at appropriate times during quenching trials. In some embodiments, robotic arms 409 may locate the surfaces of the part 50 in one or more ways, such as by using pre-loaded computer aided drafting (CAD) drawing or using laser guidance. In some embodiments, the robotic arms 409 may be configured to apply a certain level of compression force to one or more surfaces of the part 50. In some embodiments, the static temperature probes 428 may have specially designed tips such as pointed tips, needle tips, etc. to ensure sufficient penetrations into the part 50. In some embodiments, the static temperature probes 428 may take temperature measurements of the surface of the part 50 even while the quenching water or other fluid is being applied to the part and the part 50 remains static. In some embodiments, at least some robotic arms 409 may include one or multiple static temperature probes 428, thermocouples or thermocouple materials that may each measure temperature independently of one another or work in concert to measure temperatures of the part 50 surfaces.

In some embodiments, the system 400 may also include a non-contact temperature measurement system that may use non-contact temperature measuring methods (e.g., infrared) to measure temperature of the part 50 before, during, and after a quenching cycle. In some embodiments, an infrared temperature measurement system 415 may include temperature sensing equipment such as infrared pyrometers, infrared scanning system, or infrared thermal imaging cameras, may be disposed inside the water quench box 402. In some embodiments, one or more sensors 418 of the infrared temperature measurement system may be disposed above, below, and/or to either side of the part 50, which may be disposed on the top 408, bottom 414, first side 410, and/or second side 412 of the quench box 402. In some embodiments, the moving surface temperatures probes 406 and/or the infrared sensors 418 may be disposed outside the quenching zone. The infrared temperature measuring system 415 may be similar to the system 115 as described with reference to FIG. 1. In some embodiments, the moving surface temperature probes and/or the infrared sensors 418 may take temperature measurements of the surfaces of the part 50 even while the part 50 is moving.

It is contemplated that, in some embodiments, the system 400 may include any combination of the moving surface temperature probe system 401, the static temperature probe system 426, and the non-contact/infrared temperature measurement system 415. For example, some embodiments may include only a moving surface temperature probe system 401, only a non-contact/infrared temperature measurement system 415, only a static temperature probe system 426, or any combination thereof.

Figure 7:
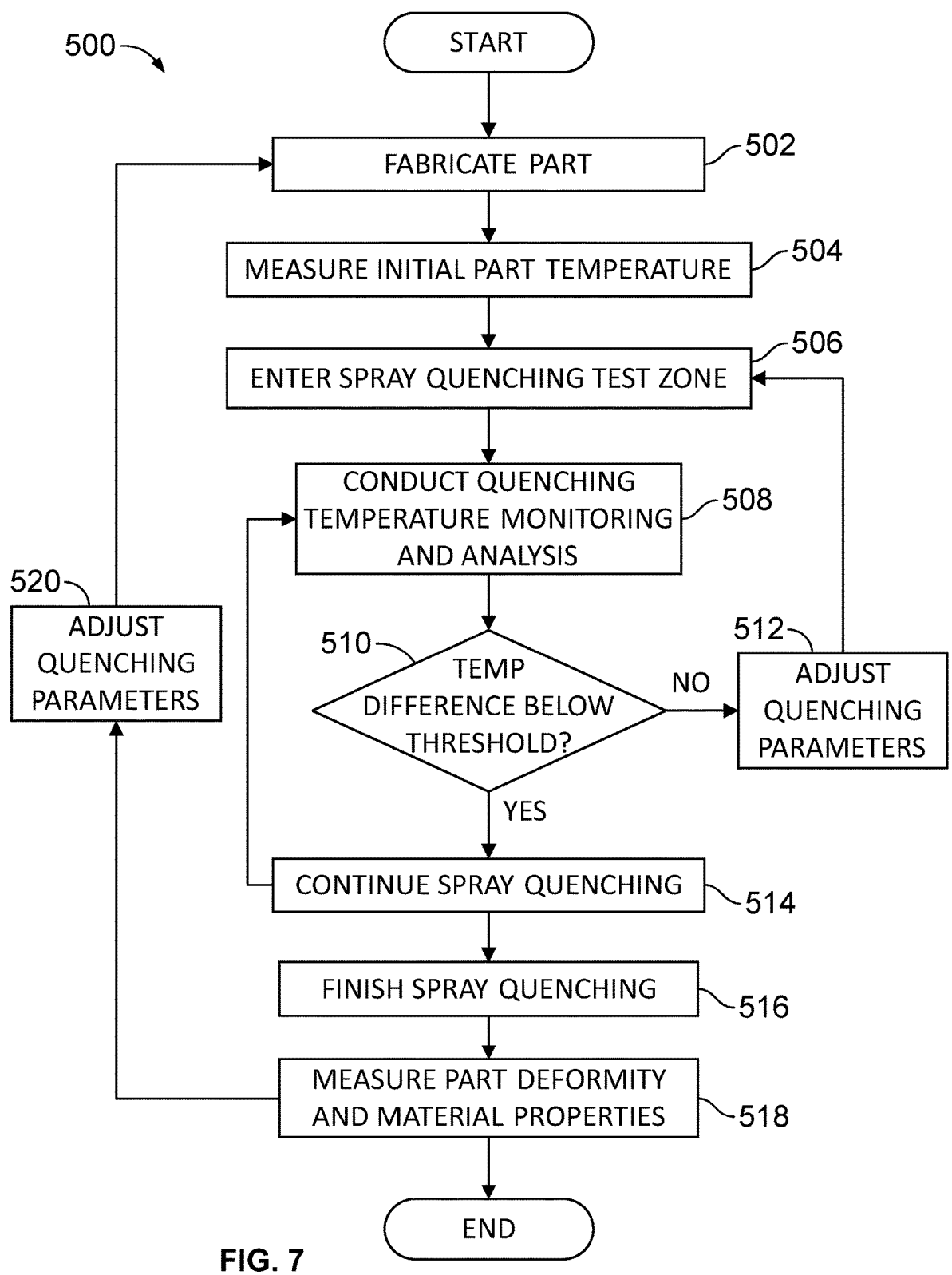
FIG. 7 is a flow chart of a method of using a spray quenching system as shown and described herein.

FIG. 7 illustrates a flow chart of an embodiment of a method 500 of using an automatic quenching system such as the quenching systems 100, 200, 300, or 400 disclosed herein. At 502, the method may include fabricating a part, such as the fabricated part 50 in FIG. 1, 3, 5, or 6. The fabrication may be via an extrusion process, or another suitable process such as injection molding, casting, sand casting, forging, etc. The part may be made from any of a variety of materials, such as aluminium alloys, magnesium alloys, steel, steel alloys, etc. At 504, the method may include measuring an initial part temperature of the part upon exiting the fabrication process. The temperature measurement may be performed using, for example, temperature sensors such as sensors 118 from FIG. 1, such as infrared cameras, infrared pyrometers, thermocouples, etc. In some embodiments, a single temperature probe and/or non-contact sensor may be used to take measurements at one or more surfaces of the part 50 throughout the method 500, or multiple probes and/or non-contact sensors may be used to take substantially simultaneous temperature measurements at multiple surfaces in some embodiments. At 506, the part may enter a spray quenching test zone within a quench box such as the quench box 102. The spray quenching test zone may include adjustable spray nozzles (e.g., spray nozzles 122, 222, 322, or 422) that may spray the part with a quenching fluid such as water, and may include mechanical or robotic arms and corresponding thermocouples such as shown and described above in view of FIG. 1, 3, or 5. In some embodiments, the spray quenching test zone may include thermocouples, such as the disposed in the grippers or temperature probes. At 508, the method may include conducting temperature monitoring and analysis. In some embodiments, the part 50 may be continuously extruded and quenched from some fabrication processes, such as an extrusion process. In some embodiments, temperature monitoring may include taking a plurality of temperature measurements across the surface of the part during the quenching process. In some embodiments, the temperature measurements may be taken using thermocouples in the grippers or the moving surface temperature probes (e.g., 116 and 216) during spray quenching, or may alternatively or additionally be taken using static temperature probes. In some embodiments, the spray quench box may also include non-contact temperature sensors (e.g., the infrared temperature measurement system 115) that may be disposed outside of the spray quenching zone and may be used to measure the part temperature during spray quenching, after spray quenching, or during a pause in spray quenching. In some embodiments, the contact and non-contact temperature sensors may provide a plurality of data points across substantially the entire surface of the part.

At 510, the method may include analyzing the temperature data to determine whether the temperature gradient or the temperature difference across the part surface is within a threshold temperature difference amount. In some embodiments, the threshold temperature difference amount may be predetermined and substantially static, or it may be determined iteratively based on prior quenching processes and corresponding analysis to determine which temperature differences may result in desirable or undesirable part properties. For example, over the course of multiple quenching trials, the computer device (e.g., computer device 150) may determine a temperature difference across the part or across particular portions of the part that is acceptable or unacceptable in order to optimize part quality. If it is determined that the temperature difference across the part or across portions of the part exceeds the threshold temperature difference, the method may include, at 512, adjusting the quenching parameters. In some embodiments, adjusting the quenching parameters may include adjusting the spray nozzle direction, flow rate, temperature, pressure, duration, concentration of spray on a part, etc. For example, if the temperature analysis determines that a first portion of the part has a temperature that is over a threshold amount over a second portion of the part, the spray nozzles may be adjusted to apply more quenching fluid to the first portion of the part to accelerate the cooling process locally. In some embodiments, the spray quenching process may be paused so as not to affect the temperature measurements taken by the sensors, and restarted once the spray parameters may be adjusted as indicated.

If the temperature difference may be determined to be below the threshold difference, the method may include, at 514, continuing the spray quenching process with no adjustments. In some embodiments, the system may, at 508, continue monitoring the temperature and making adjustments in substantially real-time if the temperature difference later exceeds the threshold. At 516, the method may include finishing the spray quenching process. In some embodiments, finishing the spray quenching process may include moving the part out of the quench box, for example, once a predetermined time has passed or when the part has reached a predetermined target temperature. In some embodiments, final temperature measurements of the part may be taken. At 518, the method may include taking additional physical measurements of the part, such as part deformity and/or determination of other material properties (e.g., strength, hardness, ductility, microstructure, etc.). At 520, the method may include additional analysis of the temperature data and/or part deformity and properties upon which additional adjustments to the quenching parameters may be made to adjust and improve the results for subsequent quenching trials.

In some embodiments, the method 500 of FIG. 7 may be used in an iterative manner on subsequent parts at least until the temperature difference and/or part deformation and other properties of the part may be found to be within acceptable or desirable parameters.

Figure 8:
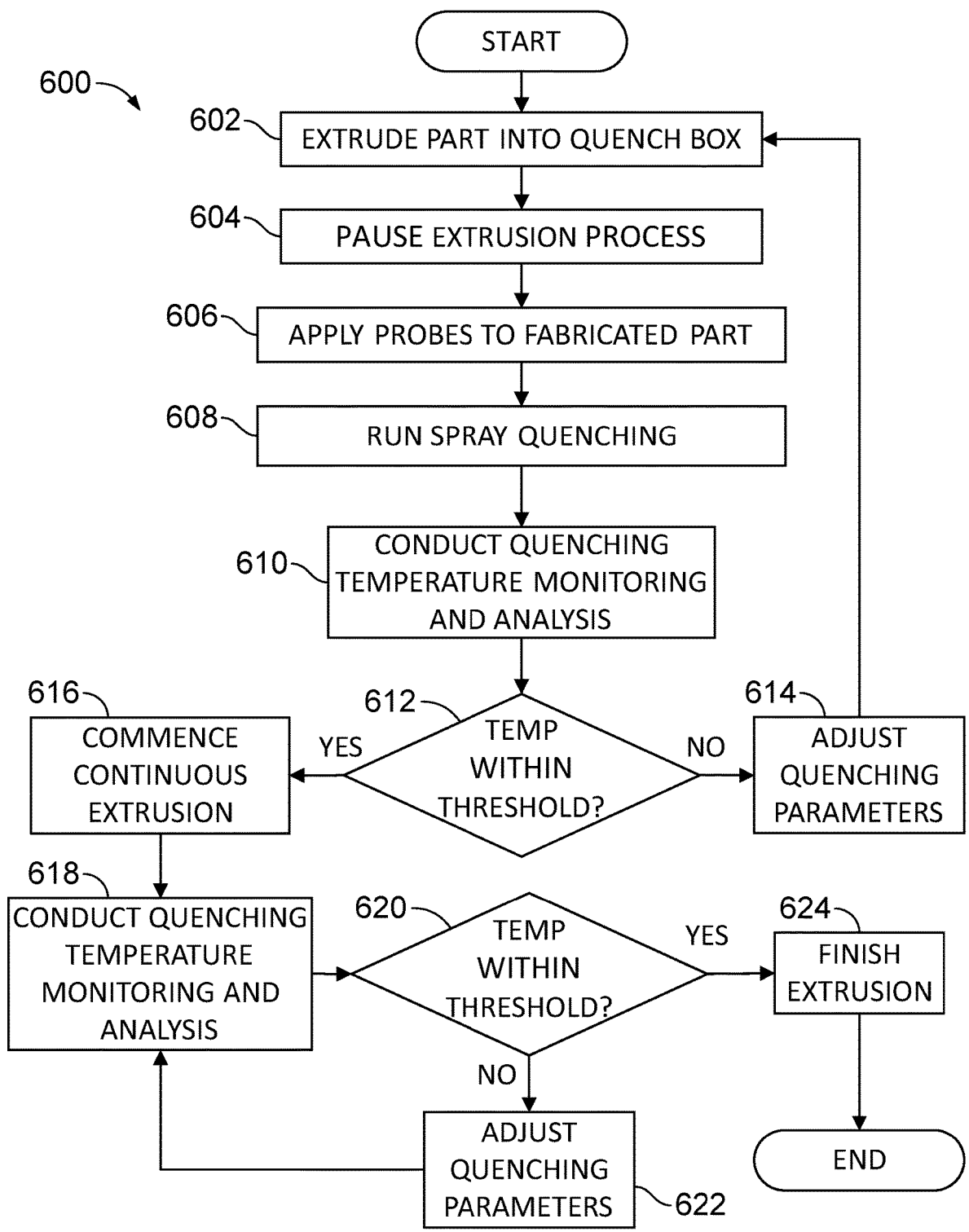
FIG. 8 is a flow chart of another embodiment of a method of using a spray quenching system as shown and described herein.

FIG. 8 is a flow chart of another embodiment of a method 600 for using an automatic spray quenching system, such as the spray quenching systems described herein with respect to FIGS. 1-6. In some embodiments, the method 600 may be used as part of an extrusion process, or other fabrication processes that may include pressing material (e.g., alloys or other metals) through a die (e.g., extrusion die). At 602, the method may include pressing a material through an extrusion die such that a part, or a portion of a part, is extruded into a quench box such as the quench box 102 of FIG. 1. At 604, the method may include pausing the extrusion process, at least temporarily, such as when at least a portion of the extrusion may be within the quench box. At 606, the method may include applying one or more static temperature probes or gripers with thermocouples to the surface of the extrusion to measure temperature at various points across the surface. In some embodiments, a single temperature probe and/or non-contact sensor may be used to take measurements at one or more surfaces of the part 50, or multiple probes and/or non-contact sensors may be used to take substantially simultaneous temperature measurements at multiple surfaces in some embodiments. At 608, the method may include spray quenching the extrusion within the quench box, such as by activating one or more sprayers, or by using predetermined initial spray quenching parameters (e.g., temperature, pressure, angles, duration, etc.). At 610, the method may include analyzing the temperature data to from the probes to determine whether the temperature gradient or the temperature difference across the part surface is within a threshold temperature difference amount.

If, at 612, the temperature differences or gradient is above or otherwise outside a threshold or a measured temperature is higher than a target temperature, the method may include, at 614, adjusting the quenching recipe to account for the temperature differences or other parameters. In some embodiments, the method 600 may include, at 602, reactivating the extrusion press to extrude an additional portion of the extrusion into the quench box. In some embodiments, steps 602-610 may be iterated until, for example, the difference in temperatures determined at 612 may be within a predetermined temperature difference threshold achieved with the modified quenching parameters (or original if unchanged).

At 616, the method may include reactivating the extrusion press and commencing a continuous extrusion process. In some embodiments, the static temperature probes may be removed from the part surface upon or prior to commencing the continuous extrusion process. At 618, the method may include monitoring the temperature of the part surface, such as with moving surface temperature probes (e.g., grippers or temperature probes) and/or using non-contact temperature sensors (e.g., infrared sensors). If, at 620, the measured temperature is higher than a target temperature and/or the temperature difference across portions of the part surface exceeds a predetermined threshold (which may be the same as or different than the threshold referenced at 612), at 622, the method may include adjusting the quenching parameters, such as on the fly without pausing the extrusion process. In some embodiments, the extrusion may be paused repeatedly to adjust parameters, or the extrusion may be paused if the measured temperature difference exceeds a secondary temperature difference threshold or any individual temperature exceeds a target temperature. At 618, the part temperature may be continually monitored using the adjusted quenching parameters in an iterative cycle. If the measured temperature is below the target temperature and/or the temperature difference across the part surface is below the temperature difference threshold, the method may include, at 624, continuing the extrusion using consistent quenching parameters until the extrusion is complete. Of course, the method may also include continually monitoring the part temperature to determine whether the temperature increases to above the target temperature and/or temperature difference increases to above the temperature difference threshold.

Figure 9:
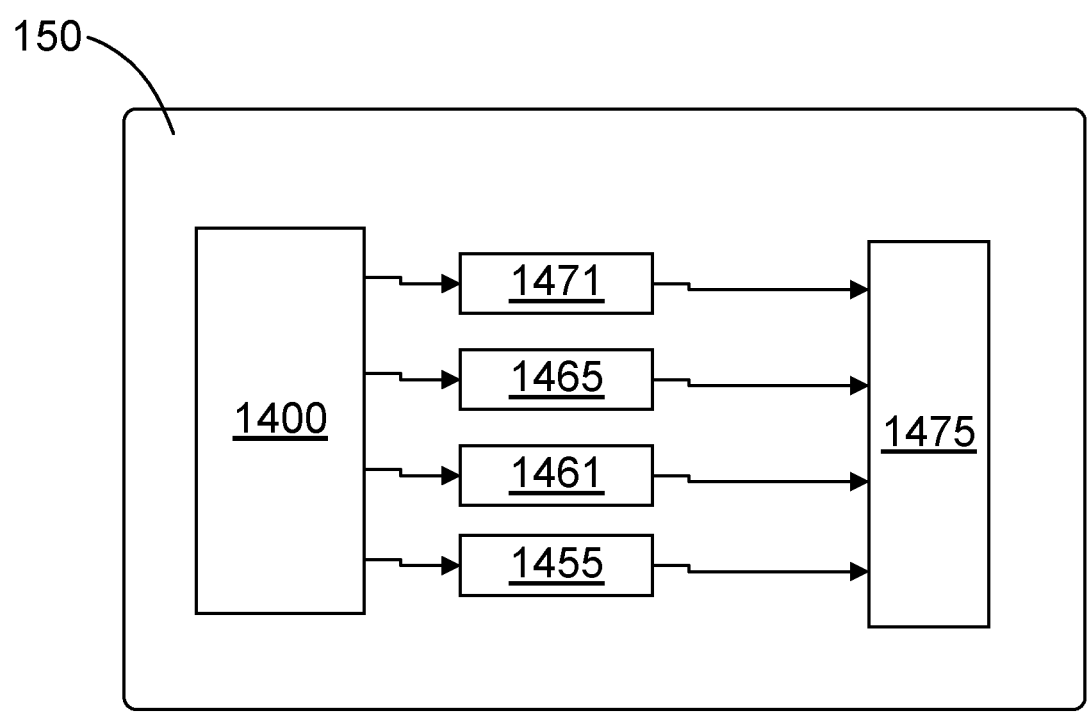
FIG. 9 is a schematic drawing of an embodiment of a computing device of the spray quenching system of FIG. 1.

FIG. 9 is a simplified illustration of the physical elements that make up an embodiment of a computing device 150. A sample computing device 150 is illustrated that is physically configured to be part of a computing system through which the systems and methods for automatic spray quenching. The computing device 150 may have a processor 1400 that is physically configured according to computer executable instructions. In some embodiments, the processor can be specially designed or configured to optimize communication between a server and the computing device 150 relating to the system and methods described herein. The computing device 150 may have a portable power supply 1455 such as a battery, which may be rechargeable. It may also have a sound and video module 1461 which assists in displaying video and sound and may turn off when not in use to conserve power and battery life. The computing device 150 may also have volatile memory 1465 and non-volatile memory 1471. The computing device 150 may have GPS capabilities that may be a separate circuit or may be part of the processor 1451. There also may be an input/output bus 1475 that shuttles data to and from the various user input/output devices such as a microphone, a camera 59, a display 56, or other input/output devices. The computing device 150 also may control communicating with the networks, such as a digital communication network, either through wireless or wired devices. Of course, this is just one embodiment of the computing device 150 and the number and types of computing devices 150 is limited only by the imagination.

The foregoing description and drawings merely explain and illustrate the invention and the invention is not limited thereto. While the specification is described in relation to certain implementation or embodiments, many details are set forth for the purpose of illustration. Thus, the foregoing merely illustrates the principles of the invention. For example, the invention may have other specific forms without departing from its spirit or essential characteristic. The described arrangements are illustrative and not restrictive. To those skilled in the art, the invention is susceptible to additional implementations or embodiments and certain of these details described in this application may be varied considerably without departing from the basic principles of the invention. It will thus be appreciated that those skilled in the art will be able to devise various arrangements which, although not explicitly described or shown herein, embody the principles of the invention and, thus, within its scope and spirit.

What is claimed is:

1. A spray quenching system comprising:
   a quench box configured to continuously receive an extruded aluminum part for quenching as part of an extrusion process;
   a conveyor configured to move the part through the quench box;
   mechanical arms disposed within the quench box;
   at least one of thermocouples and non-contact temperature sensors,
      wherein the thermocouples are disposed on the mechanical arms, the mechanical arms being configured to move the thermocouples to contact at least one surface of the part to measure temperatures along a perimeter of the part during quenching, and
      wherein the non-contact temperature sensors are disposed within the quench box and configured to measure temperatures of the at least one surface along the perimeter of the part during quenching;
   spray nozzles disposed within the quench box and configured to spray portions of the part with a quenching fluid; and
   a controller in electronic communication with the mechanical arms and the spray nozzles, and, if present, the thermocouples and the non-contact temperature sensors, the controller configured to:
      initiate a quenching process with the spray nozzles using initial quenching parameters,
      receive temperature data from at least one of the thermocouples and the non-contact temperature sensors,
      analyze the temperature data to determine a temperature difference value for the part,
      determine that the temperature difference value exceeds a threshold temperature difference value,
      adjust the quenching process based on the determination that the temperature difference value exceeds the threshold temperature difference value, and
      continuously iterate the receiving, analyzing, and adjusting steps at least until the temperature difference value does not exceed the threshold temperature difference value.

2. The system of claim 1, wherein the thermocouples are disposed in one or more grippers connected to each of the mechanical arms.

3. The system of claim 1, further comprising a laser location system configured to determine locations of the surfaces of the part.

4. The system of claim 1, wherein the mechanical arms are robotic arms with one or more hinged joints.

5. The system of claim 1, wherein the non-contact temperature sensors are infrared temperature sensors.

6. A spray quenching system comprising:
   a quench box configured to continuously receive one or more extruded aluminum parts for quenching as part of an extrusion process;
   a conveyor configured to move the parts through the quench box;
   temperature sensors configured to measure temperatures of at least one surface along a perimeter of the parts during quenching;

spray nozzles disposed within the quench box and configured to spray portions of the parts with a quenching fluid;

a controller in electronic communication with the temperature sensors and the spray nozzles, the controller configured to:
  initiate a quenching process with the spray nozzles using initial quenching parameters,
  receive temperature data from the temperature sensors,
  analyze the temperature data to determine a temperature difference value for the one or more parts,
  determine that the temperature difference value exceeds a threshold temperature difference value,
  adjust the quenching process based on the temperature data, and
  continuously iterate the receiving, analyzing, determining, and adjusting steps at least until the temperature difference value does not exceed the threshold temperature difference value.

7. The system of claim 6, further comprising robotic arms anchored to the quench box, wherein each of the temperature sensors is disposed on a respective one of the robotic arms, and wherein each of the robotic arms is configured to move each respective temperature sensor to contact the surfaces of the one or more parts.

8. The system of claim 6, further comprising a laser location system configured to determine locations of the surfaces of the one or more parts.

9. The system of claim 6, further comprising non-contact temperature sensors disposed within the quench box, wherein the non-contact temperature sensors are configured to measure the temperature of the surfaces of the one or more parts without contacting the part surfaces.

* * * * *